(12) United States Patent
Koike et al.

(10) Patent No.: US 7,224,527 B2
(45) Date of Patent: May 29, 2007

(54) REFLECTOR AND APPLICATION THEREOF

(75) Inventors: Katsuhiko Koike, Sodegaura (JP); Koichi Shimada, Sodegaura (JP); Shin Fukuda, Sodegaura (JP)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 10/545,437

(22) PCT Filed: Feb. 23, 2004

(86) PCT No.: PCT/JP2004/002055

§ 371 (c)(1),
(2), (4) Date: Aug. 12, 2005

(87) PCT Pub. No.: WO2004/074887

PCT Pub. Date: Sep. 2, 2004

(65) Prior Publication Data
US 2006/0209566 A1  Sep. 21, 2006

(30) Foreign Application Priority Data
Feb. 21, 2003  (JP)  ............... 2003-045116

(51) Int. Cl.
G02B 1/10  (2006.01)
(52) U.S. Cl. .................... 359/584; 359/585
(58) Field of Classification Search ........ 359/584–585, 359/580, 586
See application file for complete search history.

(56) References Cited

U.S. PATENT DOCUMENTS

| | | | | |
|---|---|---|---|---|
| 4,556,599 A * | 12/1985 | Sato et al. | ... | 428/216 |
| 5,140,457 A * | 8/1992 | Letter | ... | 359/359 |
| 6,312,131 B1 * | 11/2001 | Yamamoto et al. | ... | 359/507 |
| 2002/0008914 A1 | 1/2002 | Tatsumi | | |

FOREIGN PATENT DOCUMENTS

| | | |
|---|---|---|
| JP | 59-107304 A | 6/1984 |
| JP | 07-191317 A | 7/1995 |
| JP | 11-002707 A | 1/1999 |
| JP | 2000-180848 A | 6/2000 |
| JP | 2002-055213 A | 2/2002 |
| JP | 2002-198688 A | 7/2002 |
| JP | 2002-318305 A | 10/2002 |

OTHER PUBLICATIONS

Korean Patent Office, Notices of Request for Submission of Opinions, Patent Application No. 10-2005-7012903, Office Action dated Oct. 25, 2006, Korean Language, 2 pages, with English Language Translation, 2 pages.

* cited by examiner

Primary Examiner—Leonidas Boutsikaris
(74) Attorney, Agent, or Firm—Buchanan, Ingersoll & Rooney PC

(57) ABSTRACT

An object of the invention is to provide a reflector using a metal thin film layer, particularly a reflector having higher reflectance than in the prior art. Specifically, studies have been made to provide a reflector which exhibits a superior reflection-increasing effect. As a result, it has been found that if the thickness of a low refractive index thin film layer (B) which comes in contact with a metal thin film layer (A) is controlled so that it is within a range of $0.7\ \lambda/8n_L$–$1.3\ \lambda/8n_L$, a reflector having an arrangement of metal layer (A)/low refractive index thin film layer (B)/high refractive index thin film layer (C) exhibits reflectance which is extremely superior than in the prior art over a wide wavelength range. More specifically, it exhibits higher reflectance than a pure silver single film does, and a reflector superior in durability can be obtained. The lamp reflector, reflector under the light-guiding plate of the invention uses the above-mentioned reflector; therefore, if it is applied to each display device, high brilliance and vivid image can be realized. Further, since the liquid crystal display device of the invention uses the above-mentioned reflector, a clear vivid image can be realized.

6 Claims, 3 Drawing Sheets

REFLECTOR AND APPLICATION THEREOF

TECHNICAL FIELD

The present invention relates to a reflector having a laminate structure provided with a metal layer as a main component. More specifically, the invention relates to a lamp reflector, a reflector under a light-guiding plate, a backlight device and a liquid crystal display device using the reflector.

BACKGROUND ART

In recent years, a reflector has been widely used in the industry field. For example, the reflector is used as a lamp reflector in a backlight unit of a liquid crystal display device, a reflection umbrella for an illuminator, a reflective mirror in the optical system and the like. More specifically, a reflector made of aluminum, silver or white pigments as a reflective material has been widely used. For any of the above applications, the demand for high brilliance and energy saving type products have been voiced. Accordingly, reflectors having much higher reflectance have been in high demand.

As one of methods considered to increase the reflectance, there is a concept of a reflection-increasing film. Usually, a high refractive index thin film layer and a low refractive index thin film layer are laminated at a thickness of $\lambda/4n$ respectively, whereby such a film can be realized. So, a reflection-increasing film having glass and aluminum as a base has been achieved. Here, the above A refers to a wavelength of the light to be targeted, while n refers to a refractive index of the high refractive index thin film layer or the low refractive index thin film layer at the wavelength.

A reflection-increasing film having silver as a base has been reported in JP1999-2707A, JP2000-180848A, JP1995-191317A, JP2002-55213A and the like. However, the improvement of the reflectance cannot be said to be enough. In particular, there has been reported an example that the improvement of the reflectance in the long wavelength range of not less than 0.7 μm was small.

DISCLOSURE OF THE INVENTION

Therefore, the present invention has been reviewed to further increase the reflectance of a reflector using a metal layer. More specifically, an object of the invention is to provide the above reflector having a configuration of a reflection-increasing film which is highly effective in increasing the reflectance.

The present inventors have repeatedly conducted an extensive study and as a result, have surprisingly found that a reflector having a laminate structure in which a thickness of the low refractive index thin film layer which comes in contact with a metal layer is controlled to be in a specific range, i.e., thinner than $\lambda/4n$ is suitable as a substrate of the reflection-increasing reflector and is capable of realizing a reflection-increasing reflector which exhibits a high reflection-increasing effect. Thus, the present invention has been completed.

That is, the present invention relates to a reflector having a laminate structure of at least a metal layer (A), a low refractive index thin film layer (B) and a high refractive index thin film layer (C) in the order of A/B/C, wherein a thickness of the low refractive index thin film layer (B) which comes in contact with the metal layer (A) having silver as a main component is from $0.7\,\lambda/8n_L$ to $1.3\,\lambda/8n_L$ when the set wavelength of visible light is defined as $\lambda$ and the refractive index of the low refractive index thin film layer (B) is defined as $n_L$. The aforementioned reflector of the present invention exhibits a very high reflectance.

Furthermore, the present invention relates to a reflector having a laminate structure of at least a metal layer (A) and a thin film layer (B1) having a refractive index of from 0.5 to 2 in the order of A/B1, wherein a thickness of the thin film layer (B1) is from $0.7\,\lambda/8n_{L1}$ to $1.3\,\lambda/8n_{L1}$ when the set wavelength of visible light is defined as $\lambda$ and the refractive index of the thin film layer (B1) is defined as $n_{L1}$, and its reflectance is 1% or more lower than the reflectance of the metal layer (A) alone. The aforementioned reflector of the present invention is suitable as a material of the reflector having a high reflection-increasing effect.

Furthermore, the present invention relates to a lamp reflector using the aforementioned reflector. The lamp reflector of the present invention has a very high reflectance so that it can contribute to high brilliance or energy saving in various display devices.

Furthermore, the present invention relates to a reflector under a light-guiding platereflector under a light-guiding plate using the aforementioned reflector. The reflector under the light-guiding plate of the present invention has a very high reflectance so that it can contribute to high brilliance or energy saving in various display devices and provide vivid images.

Furthermore, the present invention relates to a backlight device using the wavelength reflector. The backlight device of the present invention has a very high reflectance so that it can contribute to high brilliance or energy saving in various display devices and provide vivid images.

Furthermore, the present invention relates to a liquid crystal display device using the aforementioned reflector. The liquid crystal display device of the present invention can achieve vivid images with high brilliance. Further, it can provide a device which is superior in energy efficiency as well.

For the reasons as described above, the reflector of the present invention has a very high reflectance so that it can contribute to high brilliance or energy saving in various display devices such as a liquid crystal display device and the like. Thus, industrial significance of the present invention is great.

Figure 1:
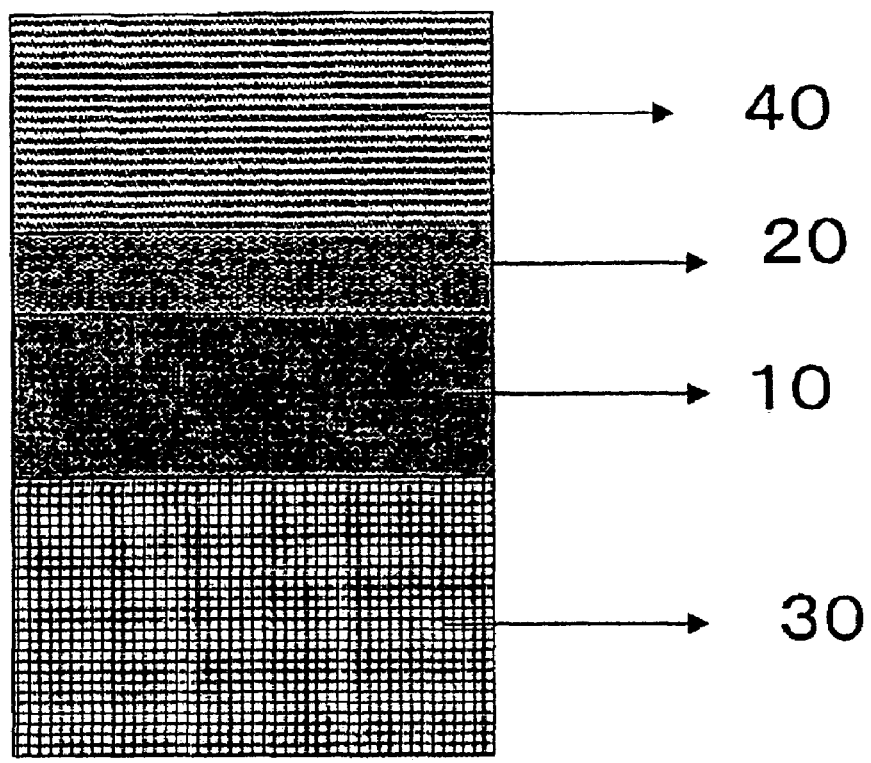
FIG. 1 is a cross-sectional view illustrating one example of the first reflector according to the present invention.

BEST MODE FOR CARRYING OUT THE INVENTION (Configuration of a Reflector)

The first reflector in the present invention has a laminate structure in the order of a metal layer (A), a low refractive index thin film layer (B) formed on the metal layer and a high refractive index thin film layer (C). Concrete examples of its configuration include a laminate structure having the number of layers of (2m+1) layers such as A/B/C, A/B/C/

B/C, A/B/C/B/C/B/C, A/B/C/B/C/B/C/B/C, A/B/C/B/C/B/C/B/C/B/C and the like, wherein m is a natural number.

Furthermore, the second reflector in the present invention has a laminate structure of a metal layer (A) and a thin film layer (B1) having a refractive index of from 0.5 to 2.0.

(Properties of the Reflector of the Present Invention)

In the present invention, a property required for the second reflector obtained by laminating the metal layer (A) and the thin film layer (B1) in a structure of A/B1 is to exhibit the reflection preventing function by providing the thin film layer (B1) and have a low reflectance. Such a property is required for the first reflector having a structure of a metal layer (A)/a low refractive index thin film layer (B)/a high refractive index thin film layer (C) to exhibit a high reflectance.

Herein, the reflectance of the second reflector being low means that the aiming reflectance at a wavelength of the light is 1% or more lower than the reflectance of the metal layer. For example, when the metal layer (A) is made of silver, a reflectance at 550 nm of a pure silver thin film having a thickness of 150 nm is 1% or more lower than a reflectance of the pure silver layer of about 97%, i.e., not more than 96%, preferably not more than 95% and more preferably not more than 94%, as compared and contrasted to aluminum oxide.

The first reflector of the present invention comprises a laminate structure in an arrangement of a metal layer (A) having silver as a main component, a low refractive index thin film layer (B) and a high refractive index thin film layer (C) in the order of A/B/C, A/B/C/B/C, A/B/C/B/C/B/C, A/B/C/B/C/B/C/B/C and A/B/C/B/C/B/C/B/C/B/C. The first reflector is laminated with the low refractive index thin film layer (B) and the high refractive index thin film layer (C) at a specific thickness in a specific order so that the superior reflection-increasing function is exhibited, resulting in exhibiting high reflectance exceeding the reflectance value of the metal layer (A) alone. As a concrete reflectance, for example, when the metal layer is made of silver, a reflectance at 550 nm of the pure silver thin film having a thickness of 150 nm is preferably 1% or more higher than a reflectance of the pure silver layer of about 97%, as compared and contrasted to aluminum oxide. More specifically, the reflectance is preferably not less than 98%, more preferably not less than 98.5%, further preferably not less than 99% and particularly preferably not less than 100%. Further, the reflectance value of the present invention is a value as compared and contrasted to aluminum oxide so that even the value of higher than 100% is not theoretically contradictory.

The reflector of the present invention exhibits, though the reason is not clearly defined, high reflectance over a wide range. It can achieve higher reflectance than the metal layer single film in almost all wavelength ranges of visible light.

Furthermore, the reflector of the present invention can be provided with a thin film layer made of other metals, metal oxides or metal compounds, or a known hard coating layer formed thereon as far as the aim of the present invention is not deviated. The effects of increasing weather resistance, enhancing stain resistance, anti-scratching property and the like can be cited. Further, an unevenness structure can be formed for the purpose of controlling the diffuse reflectance.

Further, the shape of the reflector in the present invention is not particularly restricted. Various shapes such as ] shape, U shape, V shape, umbrella shape and the like in addition to a planar shape can be used according to applications. Known techniques can be used without restrictions as a method for processing the reflector into the above shapes.

(Metal Layer (A))

As for the metal layer (A) in the present invention, a layer comprising pure silver, or an alloy of silver and a metal other than silver (a silver alloy) can be particularly preferably cited. As already known, silver is easily modified by oxygen, sulfur, chlorine, natrium and the like so that environment tolerance is low. In case of a silver alloy, one of the reasons why a metal other than silver is present is to enhance environment tolerance of silver. Other components than silver in a silver alloy are generally gold, palladium, copper, platinum, indium, neodium, cerium and the like. However, the effect of the present invention is not limited to these chemical elements.

In this case, the content of silver is usually from 70 to 99.99 weight %. When the content of materials other than silver is too much, the reflectance is too lowered in some cases. The content of silver is more preferably from 90 to 99.99 weight % and further preferably from 95 to 99.99 weight %.

In addition to silver, known metal layers having high reflectance such as gold, aluminum, chrome, nickel and the like can be used.

The metal layer (A) of the present invention is not particularly restricted as far as it has a layered shape such as metal sheets, metal foils and the like. The metal layer having a film shape having a thickness of usually from 50 to 10,000 nm is preferable when considering its application to a lamp reflector, a liquid crystal display device and the like. When the metal layer (A) is thin, the layer itself is not self-supporting. So, the layer is required to be fixed to a supporting base (D) to be described below. The thickness requiring the fixation of the layer to the supporting base is from 50 to 1,000 nm, more preferably from 100 to 500 nm and particularly preferably from 100 to 200 nm. In an application requiring the metal layer (A) to be self-supporting, the thickness is not restricted thereto, but may be not less than 1,000 nm.

Further, when the metal layer (A) is a thin film and it is too thin, the ratio of transmitted light is increased, resulting in lowering the reflectance of the reflector in some cases. Meanwhile, when the metal layer is too thick, in general, the raw material cost and production cost are increased, whereas there is no big difference in the reflectance.

A method for forming the metal layer (A) in the present invention is not particularly restricted and any known methods can be adopted. A method for forming a thin film by properly using a vacuum film-forming method is preferably used. Concrete examples of the vacuum film-forming method include a deposition method, an ion beam deposition method and a sputtering method. In the deposition method, a desired metal is used as a material and the material is heated and evaporated for conducting the deposition. In the ion beam deposition method, a desired metal material is heated and evaporated using an ion beam for conducting the deposition. Furthermore, in the sputtering method, a desired metal is used as a target, an inert gas such as argon, neon or the like is used as the sputtering gas and a gas necessary for the reaction is added thereto for conducting sputtering. Of the above methods, the sputtering method is particularly preferable.

(Supporting Base (D))

Figure 2:
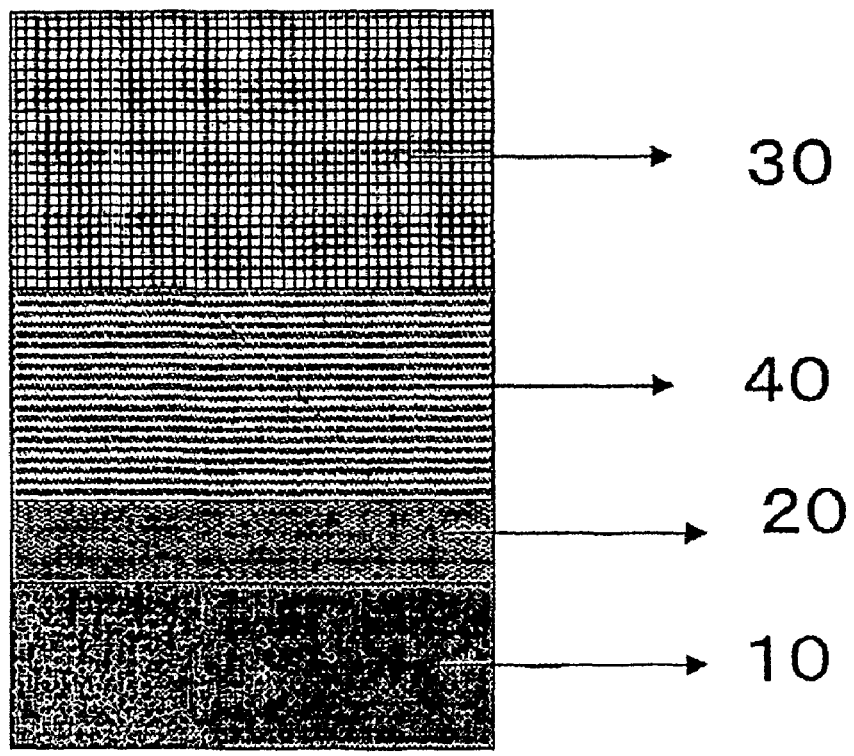
FIG. 2 is a cross-sectional view illustrating another example of the first reflector according to the present invention.
Figure 3:
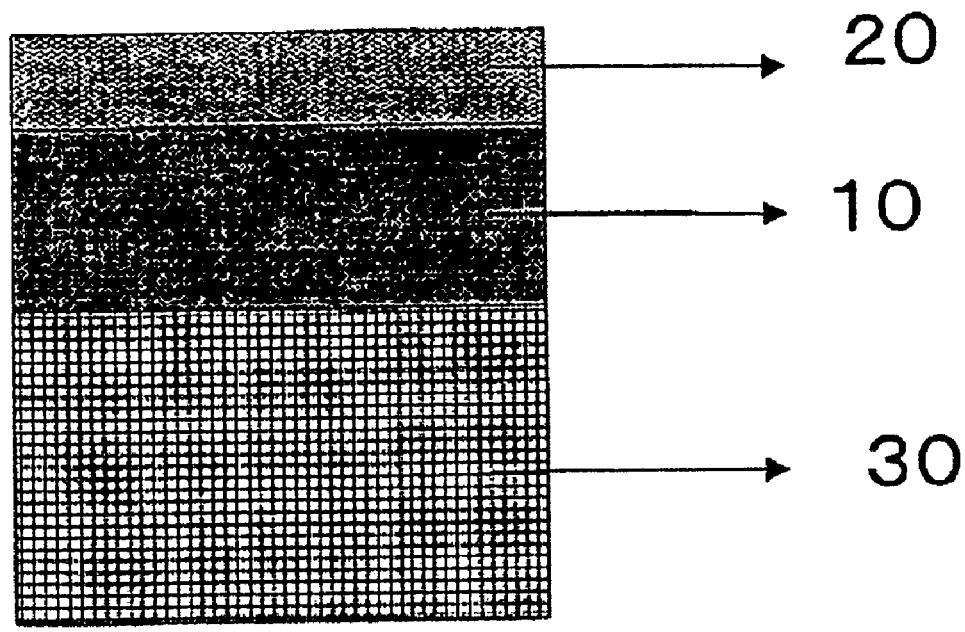
FIG. 3 is a cross-sectional view illustrating one example of the second reflector according to the present invention.

In the present invention, the reflector may be provided with a supporting base (D). In this case, the configuration of the second reflector is D/A/B and the like, while the configuration of the first reflector is D/A/B/C, D/A/B/C/B/C and the like. When the supporting base (D) is transparent, the configuration of the second reflector may be D/B/A, while the configuration of the first reflector may be D/C/B/A, D/C/B/C/B/A and the like. Here, transparency in the present invention refers to the transmittance of visible light of not less than 50%, preferably not less than 70%, more preferably not less than 80% and particularly preferably not less than 90%. Configuration examples of the first reflector of the present invention using the supporting base (D) are illustrated in FIGS. 1 and 2, while a configuration example of the second reflector is illustrated in FIG. 3. Details will follow.

A substance of the supporting base (D) and its thickness in the present invention are not particularly restricted. Substances are generally glass, resin and metal.

As the glass which can be used as the supporting base (D) of the present invention, there can be exemplified, for example, soda glass, alkali glass and silica glass. Further, it does not matter whether these glasses are tempered or a coating layer is present on the surface.

Meanwhile, concrete examples of the resin which can be used as the supporting base (D) of the present invention include polyethylene terephthalate (PET), polycarbonate (PC), polyether sulfone (PES), polyimide, polysulfone (PSF), polymethylene methacrylate (PMMA), polyether ether ketone (PEEK), polypropylene (PP), triacetyl cellulose (TAC) and the like. Of these resins, polyethylene terephthalate (PET) is preferable.

The thickness of the supporting base (D) is generally from 10 μm to 10 cm. When the thickness is too thin, rigidity is low, making it difficult to handle the supporting base in some cases. When it is too thick, there are problems such that the weight of the reflector is increased, processability is deteriorated or it is difficult to manufacture the supporting base (D) in some cases. The thickness of the supporting base is more preferably from 25 μm to 1 cm and further preferably from 50 μm to 1 mm. However, when the reflector in the present invention is used as one of parts and the thickness of not less than 10 cm is needed in consideration of the whole design, the thickness is not restricted thereto.

In the above supporting base (D), an ion coating treatment or a corona treatment can be conducted or a thin film layer comprising other metals, metal oxides or metal compounds can be formed as far as the aim of the present invention is not deviated. The effects of enhancing adhesion between the supporting base (D) and the layer (A) having silver as a main component and the like can be cited. Further, the supporting base (D) itself or an unevenness structure on the supporting base (D) can be formed for the purpose of controlling the diffuse reflectance.

(Set Wavelength of Visible Light λ)

In the present invention, the set wavelength of visible light λ is a value of a wavelength selected according to applications of the reflector. For example, when the reflector is used as a lamp reflector in a backlight unit of a liquid crystal display or used as a reflector positioned at a lower part of a light-guiding plate, the luminous reflectance is important. In this case, the wavelength of 550 nm which is the most contributing to the luminous reflectance is preferably selected as the set wavelength of visible light λ.

(Low Refractive Index Thin Film Layer (B))

In the present invention, the low refractive index thin film layer (B) forming the first reflector is a thin film layer having a refractive index $n_L$ that is relatively low. The wavelength of light to define the refractive index $n_L$ may be selected according to applications of the reflector of the present invention. In the present invention, the wavelength of visible light λ as described above is preferably used. The refractive index can be measured by the known methods. As a simple method for selecting the material of the low refractive index thin film layer (B), the refractive index value at D line as described in known documents such as the Dictionary of Chemistry (published by Kyoritsu Shuppan Co., Ltd.) and the like, of course, can also be used.

The refractive index $n_L$ of the low refractive index thin film layer cannot be uniformly defined as it is good if it is lower than that of the high refractive index thin film layer (C) to be described below, but it is preferably not less than 0.5 and not more than 2.0. The lower the refractive index $n_L$ is, the higher the reflectance of the first reflector tends to be. The lower limit is preferably 1.0, while the upper limit is preferably 1.8 and more preferably 1.6.

Examples of the substance of the low refractive index thin film layer (B) of the present invention include silicon dioxide, magnesium fluoride, lithium fluoride, cryolite, sodium fluoride, calcium fluoride, lanthanum fluoride, neodymium fluoride, aluminum oxide, cesium fluoride, lead fluoride, magnesium oxide, thorium oxide, tin oxide, lanthanum oxide, silicon oxide and the like. Of these, silicon dioxide and aluminum oxide are properly used because such materials are low in cost and film formation is easy.

The thickness of the low refractive index thin film layer (B) in the present invention is not less than $0.7 \lambda/8n_L$ and not more than $1.3 \lambda/8n_L$. The lower limit is preferably $0.8 \lambda/8n_L$ and more preferably $0.9 \lambda/8n_L$. Furthermore, the upper limit is preferably $1.2 \lambda/8n_L$ and more preferably $1.1 \lambda/8n_L$. When the thickness of the low refractive index thin film layer (B) is too far from the above range, the reflectance of the first reflector is insufficient in some cases.

Incidentally, to define the thickness of the low refractive index thin film layer (B) in the present invention, it needs to define an interface between the low refractive index thin film layer (B) and the metal layer (A). In the present invention, the element content of a metal of a material forming the low refractive index thin film layer is β atomic % and the element content of a metal of a material forming the metal layer is α atomic %. A surface at which the value of $(\alpha/(\alpha+\beta))$ becomes 0.5 is defined as an interface. The above element content can be determined by the known analysis methods such as XPS and the like to be described below. Accordingly, the film thickness can also be determined in the same manner.

As a simple method for determining the film thickness, in the vacuum film-forming method, a method for measuring the time required for forming a film to have the aiming thickness in advance under certain conditions can also be used. In this case, the film thickness for manufacturing a laminate can be controlled by the film forming time.

The value of the film thickness to be determined by these methods cannot be said to be completely consistent, but its difference is about several nanometers, which can be considered within the range of tolerance.

When other layers are laminated, an interface can be determined in the same way. When the layer is a resin layer, an interface can be determined by considering carbon as the above metal element.

The thickness of the low refractive index thin film layer (B) being λ/4n has been considered optimum by common sense from the past. For example, there has been described that the optimum film thickness when forming an aluminum oxide film on a silver base was λ/4n in a thesis published by Georg Hass in 1982 [J. Opt. Soc. Am./Vol. 72, No. 1/January 1982]. Furthermore, in JP1999-2707A is described a reflection-increasing film having silver or a silver alloy as a substrate. However, the thickness of the film to be formed on the substrate comprising silver or a silver alloy for the reflection-increasing purpose is λ/4n. However, the inventors have found that a reflector having higher reflectance than in the prior art could be surprisingly obtained by arranging the thickness of the low refractive index thin film layer (B) in the range of about $\lambda/8n_L$, though the reason is not clear.

A method for forming the low refractive index thin film layer (B) is not particularly. restricted, but the vacuum coating method is widely used. Concrete examples of the vacuum film-forming method include a deposition method, an ion beam deposition method, an ion plating method, a sputtering method and a chemical vapor phase epitaxy. In particular, the ion plating method or the sputtering method is properly used. In the ion plating method, a desired metal or a sintered body is resistance heated in a reactive gas plasma or heated by the electron beam for conducting the vacuum deposition. In the sputtering method, a desired metal or a sintered body is used as a target, an inert gas such as argon, neon or the like is used as the sputtering gas and a gas necessary for the reaction is added thereto for conducting sputtering. Incidentally, the direct current sputtering method is generally used when forming a conductive thin film, while the high frequency sputtering method is used when forming an insulating thin film in many cases. Of the above methods, the sputtering method can be particularly cited as a preferred method.

In the present invention, to form the low refractive index thin film layer (B) positioned on the metal layer (A) having silver as a main component, it is preferable to form a film under an atmosphere without containing oxygen. Here, an atmosphere without containing oxygen refers to the ratio of partial pressure of the oxygen component occupied in the film forming gas being not more than 0.9%. For example, when a film made of a metal oxide is formed in an atmosphere containing oxygen, a metal oxide thin film layer containing relatively thick silver in the film is formed so that unique high light transmittance of the above low refractive index thin film layer (B) is lost in some cases.

In the present invention, a boundary area between the metal layer (A) and the low refractive index thin film layer (B), namely, an area in which both layers coexist with each other is generated in some cases. The thickness of the area is preferably as thin as possible. As its configuration, when the low refractive index thin film layer (B) is a thin film layer comprising a metal oxide, the thickness of a portion in which the content of a metal derived from (A) is from 10 to 90 atomic % is preferably not more than 15 nm, more preferably from 0.1 to 15 nm and further preferably from 0.1 to 10 nm, based on the total atomic number of a metal derived from (A) and a metal derived from (B). The above composition and thickness are determined by analysis in the depth direction using XPS in the present invention.

The refractive index $n_{L1}$ of the thin film layer (B1) constituting the second reflector of the present invention is not less than 0.5 and not more than 2.0. The lower the refractive index $n_{L1}$ is, the lower the reflectance of the second reflector tends to be. The lower limit is preferably 1.0, while the upper limit is preferably 1.8 and more preferably 1.6. As a concrete and preferred example of the above thin film layer (B1), a thin film of a material exemplified in the low refractive index thin film layer (B) can be cited. Further, the production method can be adopted in the same manner as in the low refractive index thin film layer (B).

The thickness of the thin film layer (B1) in the present invention is not less than 0.7 $\lambda/8n_{L1}$ and not more than 1.3 $\lambda/8n_{L1}$. The lower limit is preferably 0.8 $\lambda/8n_{L1}$ and more preferably 0.9 $\lambda/8n_{L1}$. Furthermore, the upper limit is preferably 1.2 $\lambda/8n_{L1}$ and more preferably 1.1 $\lambda/8n_{L1}$. When the thickness of the thin film layer (B) is too far from the above range, the reflectance of the second reflector is not lowered 1% or more as compared to the reflectance of the metal layer (A) alone in some cases.

One example of the second reflector according to the present invention is illustrated in FIG. 3. That is, the reflector illustrated in FIG. 3, for example, forms a metal layer 10 having silver as a main component on a supporting base 30 by the sputtering method, subsequently forms a low refractive index thin film layer 20 in the absence of oxygen by the sputtering method and forms a high refractive index thin film layer 40 by the sputtering method.

(High Refractive Index Thin Film Layer (C))

The high refractive index thin film layer (C) in the present invention is a thin film layer in which its refractive index $n_H$ is higher than $n_L$. The wavelength of light to define the refractive index $n_H$ may be selected according to applications of the reflector of the present invention. In the present invention, the wavelength of visible light λ as mentioned above is preferably used. As a simple method, the refractive index at D line that many measured values are reported in a dictionary and the like, of course, can be used instead.

The refractive index $n_H$ of the high refractive index thin film layer (C) in the present invention cannot be uniformly defined as it is good if it is higher than the refractive index $n_L$ of the low refractive index thin film layer (B), but it is preferably not less than 1.6 and not more than 4.0. The higher the refractive index $n_H$ is, the higher the reflectance of the first reflector tends to be. The lower limit of the refractive index $n_H$ is preferably 1.8 and more preferably 2.0. On the other hand, the upper limit is preferably 3.5 and more preferably 3.0.

Examples of the substance of the high refractive index thin film layer (C) of the present invention include indium oxide, an oxide of indium and tin, neodium oxide, antimony oxide, zirconium oxide, selenium oxide, titanium oxide, zinc sulfide, bismuth oxide, zinc selenide, cadmium sulfide, antinomy sulfide and the like. Of these, titanium oxide and indium oxide are properly used because such materials are low in cost and film formation is easy.

The above metal oxide forming the high refractive index thin film layer (C) of the present invention can be formed into a metal oxide layer by depositing the corresponding metal and then subjecting it to oxidation by oxygen in the air, in addition to a method for depositing the metal oxide itself. In particular, to form a titanium oxide layer, this method is properly used.

The thickness of the high refractive index thin film layer (C) in the present invention is not particularly restricted. The proper thickness may be selected according to applications of the reflector. For example, when it is applied to a reflection-increasing reflector, after considering a relationship between the reflective index $n_H$ and the thickness, the proper thickness may be determined. The thickness is preferably in the range including $\lambda/4n_H$ and more specifically not less than 0.7 $\lambda/4n_H$ and not more than 1.3 $\lambda/4n_H$. Of the above range, the lower limit is preferably 0.8 $\lambda/4n_H$ and more preferably 0.9 $\lambda/4n_H$. In the meantime, the upper limit is preferably 1.2 $\lambda/4n_H$ and more preferably 1.1 $\lambda/4n_H$.

A method for forming the high refractive index thin film layer (C) is not particularly restricted, but the vacuum film-forming method is widely used as described in the low refractive index thin film layer (B). Concrete examples of the vacuum film-forming method are also the same. However, to form the high refractive index thin film layer (C) by the vacuum film-forming method, a method for forming a metal oxide in the presence of oxygen in a proper amount may be used. For example, a titanium oxide is used and a titanium oxide layer may be formed in the presence of oxygen.

As a silver thin film layer has a problem of low weather resistance as described before, a protective layer is generally formed on the silver thin film. However, the reflector of the present invention preferably has an action of exhibiting a relatively high weather resistance though a protective layer is not formed when the metal layer is a silver thin film layer. This is because the low refractive index thin film layer (B) or the high refractive index thin film layer (C) also acts as a protective layer.

One example of the first reflector according to the present invention is illustrated in FIG. 1. That is, the reflector illustrated in FIG. 1, for example, forms a metal layer 10 having silver as a main component on a supporting base 30 by the sputtering method, subsequently forms a low refractive index thin film layer 20 in the absence of oxygen by the sputtering method and forms a high refractive index thin film layer 40 by the sputtering method.

The first reflector of the present invention may be in the same structure as in FIG. 2. The reflector illustrated in FIG. 2, for example, forms a high refractive index thin film layer 40 on a supporting base 30 by the sputtering method, subsequently forms a transparent oxide layer 20 in the absence of oxygen by the sputtering method and forms a metal layer 10 having silver as a main component by the sputtering method. In this case, in order to exhibit high reflectance according to the present invention, the supporting base 30 is required to be transparent. Furthermore, on the metal layer 10 having silver as a main component, a thin film layer made of other metals, metal oxides or metal compounds or a known hard coating layer is formed or the above supporting substrate (D) is preferably adhered by an adhesive or a tackifier for the purpose of protecting silver that is easily corrosive.

Furthermore, as methods for measuring the thickness of the respective layers in the present invention, there are methods using a stylus roughness tester, a multiple-beam interferometer, a microbalance, a quartz oscillator method or the like. Among other things, the quartz oscillator method is particularly appropriate for obtaining a desired film thickness, since it can measure a film thickness while a film is being formed. Further, a thickness can be determined by performing an X-ray photoelectron spectroscopy (XPS), an Auger electron spectroscopy (AES) or a secondary ion mass spectroscopy (SIMS) in the depth direction. Further, there is a method in which film forming conditions are preliminarily set, the film is formed on a sample substrate under the thus-set conditions, a relationship between a film forming time and a film thickness is determined and, then, the film thickness is controlled by the film forming time.

(Relationship Between Refractive Indices $n_L$ and $n_H$)

In the present invention, when the reflector is a reflection-increasing reflector, that is, the metal layer (A), the low refractive index thin film layer (B) and the high refractive index thin film layer (C) are laminated in a structure of A/B/C, the refractive index $n_H$ of the high refractive index thin film layer is required to be higher than the refractive index $n_L$ of the low refractive index thin film layer. The difference between the refractive indices $n_L$ and $n_H$ is preferably not less than 0.3 and more preferably from 0.6 to 1.6.

(Analysis Method)

The analysis method of the laminate in the present invention is described below.

In the present invention, the reflectance is a value measured by placing an integrating sphere of 150φ at Hitachi spectrophotometer (type U-3400) as compared and contrasted to aluminum oxide.

The atomic composition of the laminate surface can be measured by an Auger electron spectroscopy (AES), an X-ray fluorescence spectroscopy (XRF), an X-ray microanalysis (XMA), a Rutherford backscattering spectroscopy (RBS), an X-ray photoelectron spectroscopy (XPS), a ultraviolet photoemission spectroscopy (UPS), an infrared spectroscopy (IR), a Laman spectroscopy, a secondary ion mass spectroscopy (SIMS), a low-energy ion scattering spectroscopy (ISS) and the like. Furthermore, the atomic composition in the laminate and film thickness can be examined by performing an X-ray photoelectron spectroscopy (XPS), an Auger electron spectroscopy (AES) or a secondary ion mass spectroscopy (SIMS) in the depth direction.

A constitution of the laminate and the state of each layer can be examined by using a cross-sectional microscopy, a scanning electron microscopy (SEM) and a transmission electron microscopy (TEM).

(Applications)

The reflector of the present invention is provided with the low refractive index thin film layer (B) and the high refractive index thin film layer (C), each of which is controlled to have a specific thickness so that its reflectance is very high and beautiful images can be obtained. Thus, the reflector can be properly used for a liquid crystal display device. Furthermore, it can also be properly used for a planar light source device (also referred to as a backlight device) of a liquid crystal television or a sidelight-type planar light source device used for a notebook computer and the like. More specifically, it can be used as a lamp reflector or a reflector under a light-guiding plate. As a preferred embodiment, there can be exemplified a lamp reflector which is processed into a shape according to applications after laminating a known supporting plate and the reflector of the present invention for the purpose of giving a shape stability after molding processing. When the reflector is used as a reflector under a light-guiding plate, it is preferable to regulate the diffuse reflectance by providing an unevenness structure in some cases. Further, it is also a preferred embodiment to form a layer for easily sliding in a side opposite to the reflective surface. The diffuse reflectance cannot be uniformly defined as it is different depending on applications. For example, a relatively low diffuse reflectance being from 1 to 25% tends to enable realization of vivid screen. On the other hand, when the design is focused on preventing variations in brilliance, the diffuse reflectance preferably tends to be high.

Figure 4:
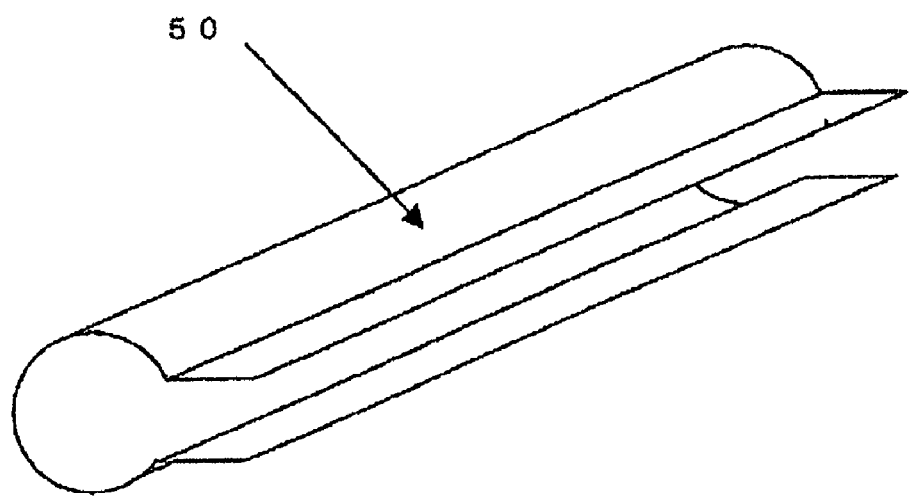
FIG. 4 is a schematic view illustrating one example of the lamp reflector according to the present invention.

FIG. 4 illustrates one example of the lamp reflector according to the present invention. This lamp reflector 50 is molded in a shape covering a light source such as a fluorescent lamp for the first reflector of the present invention in the form of a sheet.

Figure 5:
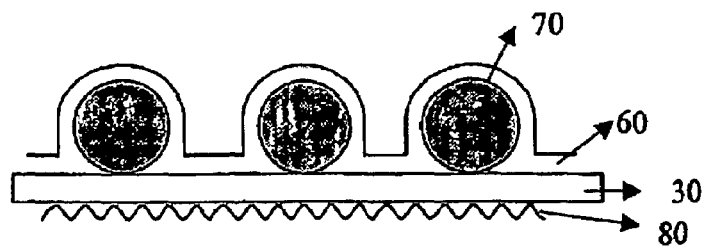
FIG. 5 is a schematic view illustrating one example of the reflector under a light-guiding platereflector under the light-guiding plate according to the present invention.

FIG. 5 illustrates one example of the reflector under a light-guiding plate according to the present invention. This reflector under a light-guiding plate forms an unevenness layer by fixing a particle 70 to a supporting base 30 by coating or the like, to which a reflective layer 60 suitable for the first reflector is formed by the sputtering method. Further, a layer for easily sliding 80 using a coating method or the like is formed on the side opposite to the reflective layer.

Figure 6:
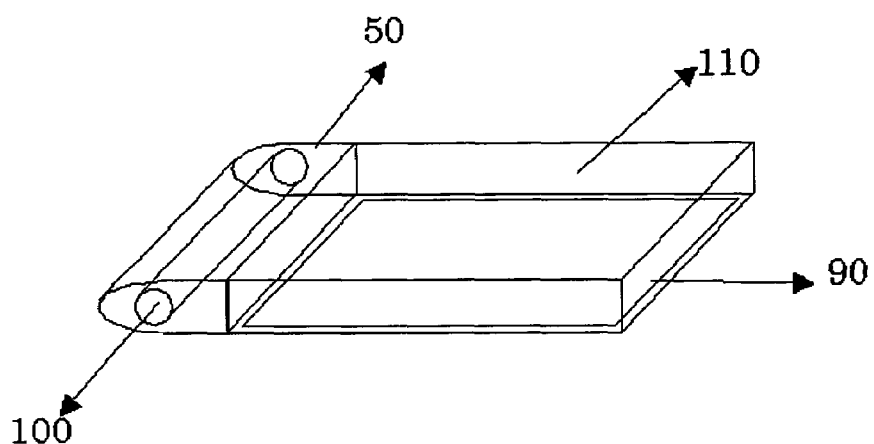
FIG. 6 is a schematic view illustrating one example of the backlight according to the present invention.

FIG. 6 illustrates one example of the backlight device according to the present invention. This backlight device is provided with a reflector under a light-guiding plate 90 on the lower side of a light-guiding plate 110 and a cold cathode tube 100 of a light source on the side of the light-guiding plate 110 along with a lamp reflector 50 in a shape of covering the cold cathode tube 100.

Besides, it can also be applied to a lamp reflector of a direct display device such as PDA or a cell phone, in addition to an LED backlight, a projection television set and a frontlight. Further, since the reflector is high in reflectance, the reflector can also be used as a light converging material for a solar cell. In particular, when the reflective layer of the reflector is conductive, taking advantage of this feature, it is able to give the function as electrodes of a minute spherical silicone single crystal solar cell or the like. Examples of other applications thereof include a strobe, a signal display, a light for a motor vehicle, a fluorescent lamp, and a flashlight which require the light-weightness and impact resistance, the reflector for chandelier lighting which requires a high quality, and further, in itself, a curved mirror or a rear view mirror.

EXAMPLES

Example 1

[Measurement of Refractive Index of a Low Refractive Index Thin Film Layer]

Polyethylene terephthalate (trademark: HSA, size: 50×50 mm, thickness: 125 μm, manufactured by Teijin Dupont Films Japan Ltd.) was prepared as a transparent substrate.

A silicon dioxide layer was formed on the transparent substrate as a low refractive index thin film layer using the high frequency sputtering method.

Silicon dioxide (purity: 99.99%) was used as a target. An argon gas (purity: 99.9% or more) was used as the sputtering gas. The deposition pressure was 0.2 Pa while the deposition power was 150 W. The deposition rate was determined in advance for adopting the time when the film thickness became 100 nm as the deposition time.

The refractive index of the silicon dioxide layer was measured using the sample according to the spectroscopic ellipsometry.

The refractive index at a wavelength of 550 nm was 1.43.

[Production of a Reflector]

A glass plate (Soda-lime glass, size: 50×50 mm, thickness: 1.1 mmt, manufactured by Asahi Glass Co., Ltd.) was prepared as a supporting base (D).

A silver layer was formed on the supporting base (D) as a metal layer (A) having silver as a main component using the direct current magnetron sputtering method. Silver (silver purity: 99.999%) was used as a target. An argon gas (purity: 99.9%) was used as the sputtering gas. The deposition pressure was 0.3 Pa while the deposition power was 62 W. A film was formed such that its thickness was 150 nm.

Subsequently, a silicon oxide layer was formed on the silver layer as formed above as a transparent oxide layer (B) using the high frequency sputtering method. Silicon dioxide (purity: 99.99%) was used as a target. An argon gas (purity: 99.9% or more) was used as the sputtering gas. The deposition pressure was 0.2 Pa while the deposition power was 150 W. The deposition rate was determined in advance for adopting the time when the film thickness became 48 nm as the deposition time.

[Measurement of Reflectance]

An integrating sphere of 150ϕ was placed at Hitachi self-recording spectrophotometer (type U-3400) and the reflectance of the sample produced in the above was measured as compared and contrasted to aluminum oxide.

Example 2

In the course of producing a reflector, the experiment was carried out in the same manner as in Example 1, except that the time when the thickness of the silicon dioxide layer became 53 nm was adopted as the deposition time.

Example 3

In the course of producing a reflector, the experiment was carried out in the same manner as in Example 1, except that the time when the thickness of the silicon dioxide layer became 58 nm was adopted as the deposition time.

Example 4

In the course of producing a reflector, the experiment was carried out in the same manner as in Example 1, except that the time when the thickness of the silicon dioxide layer became 62 nm was adopted as the deposition time.

Example 5

In the course of producing a reflector, the experiment was carried out in the same manner as in Example 1, except that the time when the thickness of the silicon dioxide layer became 43 nm was adopted as the deposition time.

Example 6

In the course of producing a reflector, the experiment was carried out in the same manner as in Example 1, except that the time when the thickness of the silicon dioxide layer became 38 nm was adopted as the deposition time.

Example 7

In the course of producing a reflector, the experiment was carried out in the same manner as in Example 1, except that the time when the thickness of the silicon dioxide layer became 33 nm was adopted as the deposition time.

TABLE 1

Thickness of Silicon Dioxide Layer

| | Physical Film Thickness [nm] | Optical Film Thickness | Reflectance [%] (at 550 nm) |
|---|---|---|---|
| Example 1 | 48 | $\lambda/8$ | 93 |
| Example 2 | 53 | $(\lambda/8) \times 1.1$ | 94 |
| Example 3 | 58 | $(\lambda/8) \times 1.2$ | 95 |
| Example 4 | 62 | $(\lambda/8) \times 1.3$ | 96 |
| Example 5 | 43 | $(\lambda/8) \times 0.9$ | 93 |
| Example 6 | 38 | $(\lambda/8) \times 0.8$ | 94 |
| Example 7 | 33 | $(\lambda/8) \times 0.7$ | 96 |
| Comparative Example 1 | 95 | $\lambda/4$ | 97 |
| Comparative Example 2 | 65 | $(\lambda/8) \times 1.35$ | 96.5 |
| Comparative Example 3 | 30 | $(\lambda/8) \times 0.62$ | 96.5 |
| Reference Example 1 | 0 | 0 | 97.5 |

Comparative Example 1

In the course of producing a reflector, the experiment was carried out in the same manner as in Example 1, except that the time when the thickness of the silicon dioxide layer became 95 nm was adopted as the deposition time.

Comparative Example 2

In the course of producing a reflector, the experiment was carried out in the same manner as in Example 1, except that the time when the thickness of the silicon dioxide layer became 65 nm was adopted as the deposition time.

Comparative Example 3

In the course of producing a reflector, the experiment was carried out in the same manner as in Example 1, except that the time when the thickness of the silicon dioxide layer became 30 nm was adopted as the deposition time.

The above results are inserted in Table 1.

Example 8

[Measurement of Refractive Index of a High Refractive Index Thin Film Layer]

A glass plate (Soda glass, size: 50×50 mm, thickness: 2 mm, manufactured by Asahi Glass Co., Ltd.) was prepared as a transparent substrate.

A titanium dioxide layer was formed on the transparent substrate as a high refractive index thin film layer using the high frequency sputtering method.

Titanium dioxide (purity: 99.99%) was used as a target. An argon gas (purity: 99.9% or more) was used as the sputtering gas. The deposition pressure was 0.2 Pa while the deposition power was 150 W. The deposition rate was determined in advance for adopting the time when the film thickness became 100 nm as the deposition time.

The refractive index of the titanium dioxide layer was measured using the sample according to the ellipsometry.

The refractive index at a wavelength of 550 nm was 2.50.

[Production of a Reflection-increasing Type Reflector]

A titanium dioxide layer was formed on a silicon dioxide thin film using the reflector produced in Example 1 as a substrate.

The titanium dioxide layer was formed using the high frequency sputtering method. Titanium dioxide (purity: 99.99%) was used as a target. An argon gas (purity: 99.9% or more) was used as the sputtering gas. The deposition pressure was 1.0 Pa while the deposition power was 300 W. The deposition rate was determined in advance for adopting the time when the film thickness became 55 nm as the deposition time.

[Measurement of Reflectance]

The reflectance of the sample as produced above was measured in the same manner as in Example 1.

Example 9

In the course of producing a reflector, the experiment was carried out in the same manner as in Example 8, except that the reflector produced in Example 2 was used as a substrate for forming a titanium dioxide layer.

Example 10

In the course of producing a reflector, the experiment was carried out in the same manner as in Example 8, except that the reflector produced in Example 3 was used as a substrate for forming a titanium dioxide layer.

Example 11

A In the course of producing a reflector, the experiment was carried out in the same manner as in Example 8, except that the reflector produced in Example 4 was used as a substrate for forming a titanium dioxide layer.

Example 12

In the course of producing a reflector, the experiment was carried out in the same manner as in Example 8, except that the reflector produced in Example 5 was used as a substrate for forming a titanium dioxide layer.

Example 13

In the course of producing a reflector, the experiment was carried out in the same manner as in Example 8, except that the reflector produced in Example 6 was used as a substrate for forming a titanium dioxide layer.

Example 14

In the course of producing a reflector, the experiment was carried out in the same manner as in Example 8, except that the reflector produced in Example 7 was used as a substrate for forming a titanium dioxide layer.

Example 15

In the course of producing a reflector, the experiment was carried out in the same manner as in Example 8, except that argon having an oxygen concentration of 3% was used when forming a titanium dioxide layer using a Teijin polyethylene terephthalate film (thickness: 125 μm) instead of the glass substrate.

Comparative Example 4

In the course of producing a reflector, the experiment was carried out in the same manner as in Example 8, except that the reflector produced in Comparative Example 1 was used as a substrate for forming a titanium dioxide layer.

Comparative Example 5

In the course of producing a reflector, the experiment was carried out in the same manner as in Example 8, except that the reflector produced in Comparative Example 2 was used as a substrate for forming a titanium dioxide layer.

Comparative Example 6

In the course of producing a reflector, the experiment was carried out in the same manner as in Example 4, except that the reflector produced in Comparative Example 3 was used as a substrate for forming a titanium dioxide layer.

Reference Example 1

[Production of a Reflector]

A glass plate (Soda-lime glass, size: 50×50 mm, thickness: 1.1 mmt, manufactured by Asahi Glass Co., Ltd.) was prepared as a supporting base (C).

A silver layer was formed on the supporting base (C) as a metal layer (A) having silver as a main component using the direct current magnetron sputtering method. Silver (silver purity: 99.999 %) was used as a target. An argon gas (purity: 99.9%) was used as the sputtering gas. The deposition pressure was 0.3 Pa while the deposition power was 62 W. A film was formed such that its thickness was 150 nm.

[Measurement of Reflectance]

The reflectance of the sample as produced above was measured using a spectrophotometer.

Figure 7:
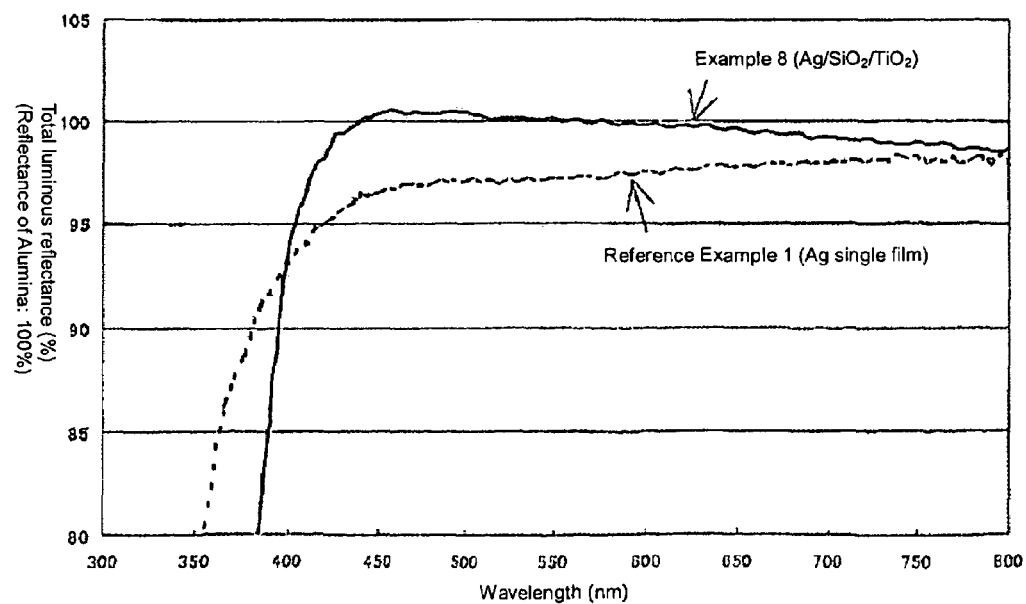
FIG. 7 illustrates one example of the reflection spectrum of the first reflector according to the present invention.

The above results are inserted in Tables 1 and 2 and FIG. 7.

TABLE 2

Thickness of Silicon Dioxide Layer

| | Physical Film Thickness [nm] | Optical Film Thickness | Reflectance [%] (at 550 nm) |
|---|---|---|---|
| Example 8 | 48 | $\lambda/8$ | 100.5 |
| Example 9 | 53 | $(\lambda/8) \times 1.1$ | 99.3 |
| Example 10 | 58 | $(\lambda/8) \times 1.2$ | 98.5 |
| Example 11 | 62 | $(\lambda/8) \times 1.3$ | 98 |
| Example 12 | 43 | $(\lambda/8) \times 0.9$ | 99.2 |
| Example 13 | 38 | $(\lambda/8) \times 0.8$ | 98.2 |
| Example 14 | 33 | $(\lambda/8) \times 0.7$ | 98 |
| Example 15 | 48 | $\lambda/8$ | 99.2 |
| Comparative Example 4 | 95 | $\lambda/4$ | 96 |
| Comparative Example 5 | 65 | $(\lambda/8) \times 1.35$ | 97 |
| Comparative Example 6 | 30 | $(\lambda/8) \times 0.62$ | 97 |
| Reference Example 1 | 0 | 0 | 97.5 |

As understood from Table 2, it is found that a reflector obtained by laminating a metal layer (A) having silver as a main component, a low refractive index thin film layer (B) and a high refractive thin film layer (C) in a structure of A/B/C has the highest reflectance when the optical film thickness of the low refractive index thin film layer, i.e., a silicon dioxide layer is around $\lambda/8$. Furthermore, when the optical film thickness of the silicon dioxide layer is in the range of not less than $\lambda/8 \times 0.7$ and not more than $\lambda/8 \times 1.3$, it is found that the reflector has high reflectance of not less than 98%. This reflectance is found high as compared to a reflector comprising only a reflection layer having silver as a main component. Further, FIG. 7 illustrates a reflectance spectrum of Example 8 and Reference Example 1. Namely, it is an example of the reflection spectrum of the first reflector. The reflector of the present invention has high reflectance in a very wide range and is capable of increasing the reflectance more than a silver single film in all visible light ranges.

Meanwhile, as understood from Table 1, it is found that a reflector comprising a metal layer (A) having silver as a main component and a low refractive index thin film layer (B) has the lowest reflectance as compared to a reflector comprising only silver when the optical film thickness of the low refractive index thin film layer, i.e., a silicon dioxide layer is $\lambda/8$. Furthermore, when the optical film thickness of the silicon dioxide layer is in the range of not less than $\lambda/8 \times 0.7$ and not more than $\lambda/8 \times 1.3$, it is found that the reflector has low reflectance of not more than 96%. This reflectance is found 1% or more lower than the reflectance of a reflector comprising only a metal layer having silver as a main component.

By setting the film thickness of the low refractive index thin film layer (B) as described above to a specific range including $\lambda/8n_L$, it is possible to realize high reflectance for a reflector obtained by laminating a metal layer (A), a low refractive index thin film layer (B) and a high refractive index thin film layer (C) in a structure of A/B/C, as compared to a reflector comprising only a metal layer (A).

The invention claimed is:

1. A reflector having a laminate structure of at least a metal layer (A), a low refractive index thin film layer (B), a high refractive index thin film layer (C) in the order of A/B/C, wherein a thickness of the low refractive index thin film layer (B) which comes in contact with the metal layer (A) having silver as a main component is from $0.7 \lambda/8n_L$ to $1.3 \lambda/8n_L$ when the set wavelength of visible light is defined as $\lambda$ and the refractive index of the low refractive index thin film layer (B) is defined as $n_L$.

2. A reflector having a laminate structure of at least a metal layer (A) and a thin film layer (B1) having a refractive index of from 0.5 to 2 in the order of A/B1, wherein a thickness of the thin film layer (B1) is from $0.7 \lambda/8n_{L1}$ to $1.3 \lambda/8n_{L1}$ when the set wavelength of visible light is defined as $\lambda$ and the refractive index of the thin film layer (B1) is defined as $n_{L1}$ and its reflectance is 1% or more lower than the reflectance of the metal layer (A) alone.

3. A lamp reflector comprising the reflector as described in claim 1.

4. A reflector as described in claim 1 provided under a light-guiding plate.

5. A backlight device comprising the reflector as described in claim 1.

6. A liquid crystal display device comprising the reflector as described in claim 1.

* * * * *